March 1, 1938. L. E. MITCHELL 2,109,925
AUTOMATIC BELT ALIGNING IDLER
Filed Dec. 5, 1935
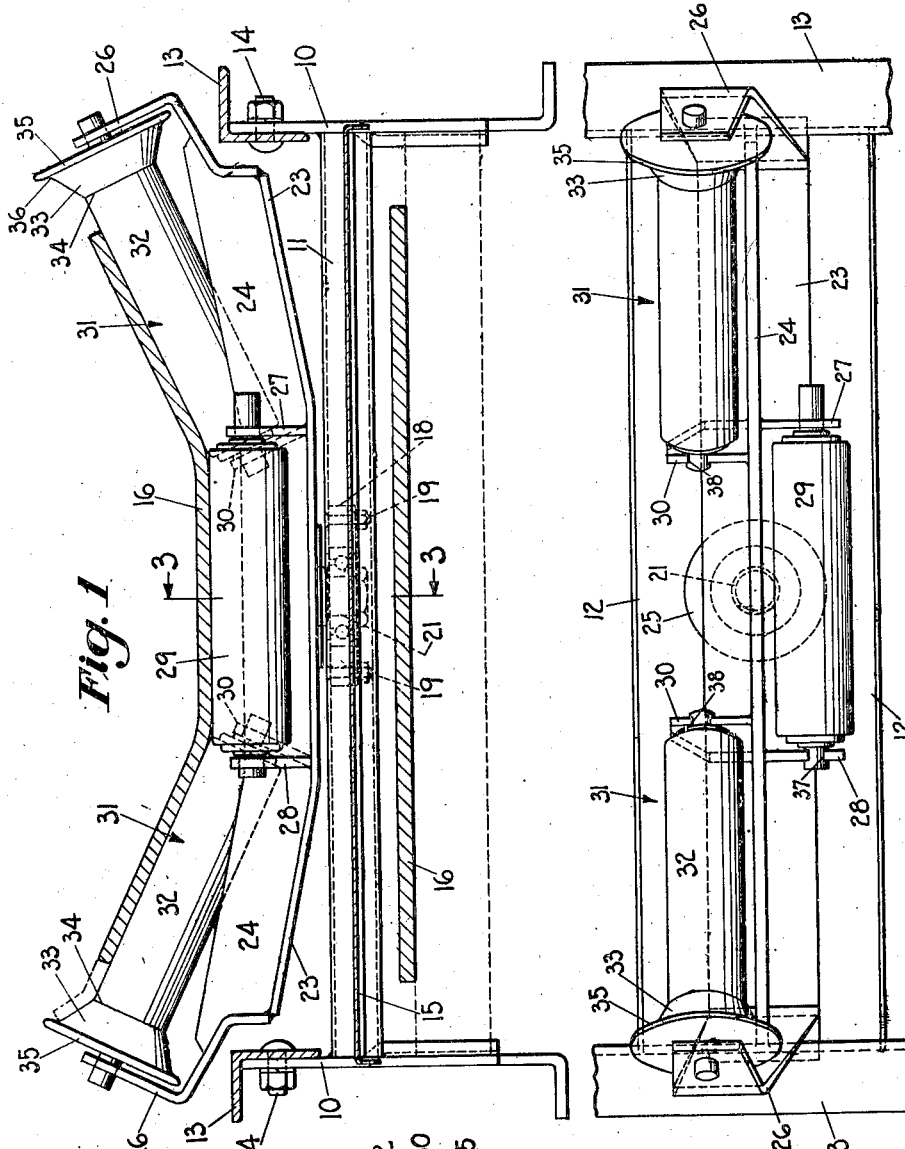
INVENTOR:
LEWIS E. MITCHELL.
By Chas. M. Nissen,
ATTY.

Patented Mar. 1, 1938

2,109,925

UNITED STATES PATENT OFFICE 2,109,925

AUTOMATIC BELT ALIGNING IDLER

Lewis E. Mitchell, Columbus, Ohio, assignor to The Jeffrey Manufacturing Company, a corporation of Ohio Application December 5, 1935, Serial No. 53,053

6 Claims. (Cl. 198—202)

This invention relates to an improved automatic belt aligning idler.

An object of the invention is to provide a device of the above mentioned type in which the number of parts is reduced to a minimum yet which is very effective to provide automatic alignment of a conveyor belt.

A more specific object of the invention is to provide a device of the above mentioned type in which a plurality of belt supporting idlers are carried on a freely swinging frame, the idlers adjacent the outer ends being provided with frustoconical outer end surfaces adapted to provide friction between the outer rollers and the belt when the belt becomes out of alignment, thereby to swing the pivoted frame to produce automatic realignment of the belt.

Other objects of the invention will appear hereinafter, the novel features and combinations being set forth in the appended claims.

In the drawing,

Fig. 1 is an elevational view of the device comprising my invention;

Fig. 2 is a plan view of the device of Fig. 1;

Fig. 3 is a sectional view taken on the line 3—3 of Fig. 1, looking in the direction of the arrows; and Fig. 4 is an enlarged view of an outer idler flange.

Referring to the drawing there is seen a stationary main frame formed by a pair of upright side plates 10, 10 between which extends a transverse supporting member 11 in the form of an inverted trough having wings 12, 12. Said transverse member 11 will be rigidly attached to the side plates 10, 10 as by welding. Said side plates 10, 10 and transverse member 11 form a chair. In the complete conveyor there will be a plurality of these chairs at spaced intervals which may be rigidly connected together by longitudinally extending angle members 13, 13. Appropriate nuts and bolts 14, 14 may be provided to connect said angle members 13, 13 and said side plates 10, 10 whereby ready removal thereof is provided.

It may be mentioned that between adjacent chairs of the complete conveyor there extend cover plates 15, 15 for the lower run of the belt 16, the ends of which cover plates rest upon and are supported by the wings 12, 12. The transverse supported member 11 is provided with an aperture 17 intermediate the ends thereof, below which is positioned a cup 18 rigidly attached to said transverse member 11 as by nuts and bolts 19, 19. The cup 18 supports a ball thrust bearing 20, to the inner race of which is rigidly attached an upwardly extending shaft 21 by a nut 22. The shaft 21 is rigidly attached to a belt idler supporting frame comprising a longitudinally extending plate 23 having an upwardly extending rib 24 which is positioned substantially midway between the edges thereof. A reinforcing ring 25 is also provided on the lower surface of the plate 23 adjacent the shaft 21.

Adjacent the ends of the plate 23 and rigidly attached to said plate and to said rib 24, as by welding, are upwardly extending end brackets 26, 26. On one side of the rib 24 and between the ends of the plate 23, I provide a pair of brackets 27 and 28 for supporting a horizontal idler roller 29. The bracket 27 is provided with an aperture to receive the round shaft of the idler roller 29, and the bracket 28 is provided with an open end slot adapted to receive the milled grooves 37 of the other end of the shaft of idler roller 29. It will be evident that idler roller 29 is removably supported by the brackets 27 and 28, and rotation thereof is prevented by said bracket 28.

Substantially opposite the brackets 27 and 28 on the other side of the rib 24, I also provide a pair of inclined brackets 30, 30. Brackets 30, 30 are provided with slots to receive the milled ends 38, 38 of supporting shafts for the outer idler rollers 31, 31, the outer shaft ends of which are supported by apertures in the brackets 26, 26.

One important feature of my invention resides in the construction of the outer idler rollers 31, 31 which are similar, thus a description of one will suffice for both. Each of said outer idler rollers 31, 31 comprises a cylindrical portion 32 to which is connected at the outer end a frustoconical portion 33. The smallest diameter of the frusto-conical portion 33 is the same as the diameter of the cylindrical portion 32 and they are connected together along the circular line 34. It will thus be seen that outer idler roller 31 increases in diameter adjacent its outer end. The extreme outer end of said idler roller 31 is provided with a circular flange 35 which has a diameter even greater than the base of the frustoconical portion 33. The connection between the base of the frusto-conical portion 33 and the flange 35 is preferably smoothly curved as seen at 36, thereby to prevent an abrupt change in diameter of the outer roller. (See Fig. 4).

In the operation of the device, the belt 16 will normally be in the position illustrated in full lines in Fig. 1. However, should for any reason the belt become out of alignment and move to one side of one of the outer idler rollers 31, the outer edge of said belt will ride on the frusto-conical portion 33 and may even tend to ride up on the flange 35. Under either condition it will be evident that there will be portions of the belt 16 contacting with portions of one of the rollers 31 which are traveling at different peripheral velocities due, of course, to the different peripheral velocities of the cylindrical portion 32, the frusto-conical portion 33, and the flange 35. As a consequence the pivoted frame which carries the idler rollers 29, 31, 31 will pivot about the axis of shaft 21 and will tend to guide the belt 16 to its normal position. For instance, if the belt moves to the dotted line position shown in Fig. 1, the belt carrier will be skewed in a clockwise direction as viewed in plan, from its right angle position, shown in Fig. 2, to a diagonal position, where it will automatically act to direct the belt toward its central position whereupon such right angle position of the belt carrier will be restored. As the belt moves towards its normal position, the above mentioned friction will be reduced progressively, whereupon the pivoted frame will assume its normal position after the belt has been automatically brought into proper alignment. It is thus evident that a very simple but effective automatic belt aligning idler has been provided by my invention.

It may be mentioned that the stationary parts of the pivoted frame comprising the plate 23, rib 24, reinforcing ring 25, brackets 26, 27 and 28, may all be rigidly attached together as by welding.

It is also to be noted that the idler roller 29 and the outer idler rollers 31 are all readily removably supported upon the frame and may be easily removed by a hand operation without requiring the use of any tools.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In an automatic belt aligning idler, the combination with a main frame, of a belt idler supporting frame pivotally mounted thereon for free movement about an upright axis, a plurality of belt supporting idlers on said supporting frame including generally cylindrically shaped outer idlers mounted on inclined axes to form a supported belt in the form of a trough, the outer ends of said outer idlers terminating in attached frusto-conical surfaces which increase in diameter from the main body of the rollers, and means for mounting said outer idlers for rotation on said axes and holding them against axial movement.

2. In an automatic belt aligning idler, the combination with a main frame, of a belt idler supporting frame pivotally mounted thereon for free movement about an upright axis, a plurality of belt supporting idlers on said supporting frame including outer idlers the main body portion of each of which is cylindrical, the outer ends of said outer idlers terminating in frusto-conical surfaces which increase in diameter from the main body portions of the rollers and are bounded at their outer ends by flanges having a smooth curved surface connecting them to said frusto-conical surfaces, and means for holding said outer idlers against axial movement.

3. An idler roller comprising a cylindrical body portion, a frusto-conical end portion and a flange adjacent the outer end of said frusto-conical portion, said flange connecting said frusto-conical portion by a smooth curved surface.

4. In an automatic belt aligning idler, the combination with a main frame, of a belt idler supporting frame pivotally mounted thereon for free movement about an upright axis, a plurality of belt supporting idlers on said supporting frame including generally cylindrically shaped outer idlers mounted on inclined axes to form a supported belt in the form of a trough means for holding said outer idler against axial movement, the outer ends of said outer idlers terminating in surfaces which increase in diameter from the main body of the rollers.

5. In an automatic belt aligning idler, the combination with a main frame, of a belt idler supporting frame pivotally mounted thereon for free movement about an upright axis, a plurality of belt supporting idlers on said supporting frame including outer idlers, the outer ends of said outer idlers terminating in surfaces which increase in diameter from the main body of the rollers and are bounded at their outer ends by flanges having a smooth curved surface connecting them to said surfaces, and means for holding said outer idlers against axial movement.

6. In an automatic belt aligning idler, the combination with a main frame, of a belt supporting frame pivoted to said main frame to swing freely, and belt supporting means carried by said supporting frame, means constructed and arranged to prevent axial movement of said belt supporting means, said belt supporting means comprising cylinders with outer ends of increasing diameters and so constructed and arranged that said supporting frame will swing when a supported belt moves out of alignment thereby to realign said belt.

LEWIS E. MITCHELL.